3,395,229
PROCESS AND PRODUCT FOR COMBATTING IRON DEFICIENCY ANEMIA IN SUCKLING PIGS

William H. Feigh, Indianapolis, and Robert G. Buescher, Whiteland, Ind., assignors to Mattox and Moore, Inc., Indianapolis, Ind., a corporation of Indiana
No Drawing. Continuation of application Ser. No. 256,158, Feb. 4, 1963. This application July 3, 1967, Ser. No. 657,459
10 Claims. (Cl. 424—295)

ABSTRACT OF THE DISCLOSURE

This invention relates to compositions of iron choline citrate and processes for the prevention and treatment of iron deficiency anemia in suckling pigs which comprise orally administering to the mother sow a quantity of iron choline citrate.

---

This application is a continuation of our copending application Ser. No. 256,158, filed Feb. 4, 1963 and now abandoned.

Iron deficiency anemia occurs in new born pigs, especially those farrowed and raised in farrowing pens or crates on concrete in which the pigs have no contact with the ground. Anemia of this type is observed between about the third day after farrowing until about the end of the third week or until the pigs begin eating feed other than sow's milk. It is believed that pigs born of a normal healthy sow on standard rations have a reserve supply of iron sufficient to prevent iron deficiency anemia for from three to seven days and that pigs receive inadequate supplies of iron in the milk from their mother. Accordingly, the period in which iron deficiency anemia is observed is the period after the initial birth supply of iron has been depleted and before sufficient additional iron is consumed by way of standard rations.

Iron compounds have been developed for injection into the pigs and for oral administration to the pigs to combat iron deficiency anemia. These methods of administration, however, are laborious and hazardous, and commonly require handling the pigs individually and subjecting them to the shock of handling and injection or forced oral ingestion during their critical early days of life. Furthermore, if the pigs are not deficient in iron, administration of iron by injection into the body of the pig is capable of producing an iron toxicity resulting in death of the pig.

The most desirable method of combatting iron deficiency anemia in suckling pigs would be to supply the iron to the sows in a form which would be passed on to the pig. This has been tried unsuccessfully by many researchers, both by feeding and by injecting the sow with iron compounds.

We have discovered that iron deficiency anemia in suckling pigs can be prevented and treated by administering to the mother sow in her standard ration or drinking water, a quantity of iron choline citrate. The administration is preferably begun a few days, say from 7 to 14 days, prior to farrowing and is continued for a period of about three weeks after farrowing, or until weaning.

The iron choline citrate is administered by mixing it with the ration, or with a portion of the ration, or is proportioned into its drinking water. The level of administration is desirably at least about 600 milligrams, and preferably about 1200 milligrams, of elemental iron from iron choline citrate per day for each 100 pounds of body weight of the sow. Higher levels may be used, up to about 1600 milligrams per 100 pounds of body weight. A 400-pound sow receives from 2.4 grams to 6.4 grams and preferably about 4.8 grams of elemental iron from iron choline citrate per day. Since lactating sows consume an amount of ration each day equal to about two percent (2%) of their body weight, these levels of administration may be obtained by mixing the iron choline citrate in the total ration in proportions to supply from 300 milligrams to 800 milligrams of elemental iron per pound total ration, and preferably about 600 milligrams per pound of total ration.

Corresponding levels of administration may be obtained by furnishing the iron choline citrate for ingestion by the sow in drinking water. Since lactating sows consume water in amounts equal to about 8 percent to 12 percent of their body weight per day, the desired levels of administration may be obtained by introducing the water-soluble iron choline citrate in the drinking water in ratios to supply from 78 milligrams of elemental iron per pound of water (to give 600 mg./100 lbs. of body weight of a sow drinking as little as 8 percent water per day) up to 200 milligrams per pound of water (to give 1600 mg./100 lbs. of body weight of a sow drinking 8 percent water per day). The preferred level of 1200 milligrams of elemental iron per 100 pounds of body weight per day, at a water intake rate of 8 percent of body weight, is equivalent to 150 milligrams of iron choline citrate per pound of water, and at a water intake rate of 12 percent of body weight, is equivalent to 100 milligrams of iron choline citrate per pound of water.

Example

An experimental example of the use and results of the new use of iron choline citrate in our method of combatting iron deficiency anemia is as follows:

Four treatments were used, including, (1) the negative control in which neither the pigs or the sows received supplemental iron; (2) the positive control, which consisted of injecting the pigs three days after farrowing with 1 cc. of an iron dextrin compound (Pigdex–100, American Cyanamid Co.) supplying 100 milligrams of elemental iron per pig; (3) a low-level test which consisted in feeding iron choline citrate to the sows at a level to supply 200 milligrams of elemental iron from iron choline citrate per pound of total ration; and (4) feeding iron choline citrate to the sows at a level supplying 600 milligrams of elemental iron from iron choline citrate per pound of total ration.

The amount of choline citrate used will depend on its grade. For example, with pharmaceutical grade iron choline citrate, each gram is equivalent to 120 mg. of elemental iron, and 100 mg. of elemental iron corresponds to 833 milligrams of iron choline citrate.

Hemoglobin levels were determined at two weeks of age for each pig by a colorimetric method using an A. O. Spencer Hemoglobinometer (Hb meter). Hemoglobin levels are expressed in grams of hemoglobin per 100 milliliters of blood.

(1) In the negative control treatment, the sow (Sow No. 20) farrowed eight pigs, and after two weeks their hemoglobin levels were determined to be as follows: 5.8, 7.0, 6.4, 4.8, 10.0, 5.4, 6.0, and 7.2. The average hemoglobin level of this negative control group was 6.58 grams of hemoglobin per 100 milliliters of blood, which is in an anemic state.

(2) In the positive control treatment, the sow (Sow No. 30) farrowed twelve pigs, which were injected at three days of age with the "Pigdex 100" iron product described above. At two weeks of age, the twelve pigs were found to have the following hemoglobin levels: 15.0, 11.0, 12.2, 10.5, 10.0, 10.1, 11.0, 9.8, 10.0, 11.3, 11.6, and 13.3. The average was 11.3 grams of hemoglobin per 100 milliliters of blood.

(3) In the low-level test, treatment number three above, the sow (Sow No. 40) received 200 milligrams of iron from iron choline citrate per pound of sow ration, beginning about a few days before farrowing and continuing thereafter. She farrowed 9 pigs, and at the end of two weeks the hemoglobin levels of the pigs were determined to be as follows: 7.8, 4.8, 5.9, 7.3, 7.3, 5.8, 6.9, 6.5, and 7.5. The average hemoglobin was 6.64 or approximately the same as the negative controls.

(4) In treatment number four described above, the sow (Sow No. 31) received 600 milligrams of elemental iron from iron choline citrate per pound of ration, beginning a few days before farrowing and continuing thereafter. She farrowed eleven pigs. Their hemoglobin levels at the end of two weeks were: 10.2, 12.0, 10.2, 9.0, 10.4, 12.2, 12.5, 12.4, 10.0, 11.3, and 10.0. Their average hemoglobin level was 10.93, which is substantially the same as the positive controls.

The iron choline citrate may be mixed either with the whole ration, as in the foregoing example, or with part of the ration. A convenient method is to mix the iron choline citrate with a protein supplement or premix, and then mix this with grain or other ration. Various procedures may be used to suit the preference of the grower, provided that iron choline citrate is administered at a level sufficient to produce transfer of iron to the pigs by way of feeding to the mother sow.

We claim:

1. The method of combatting iron deficiency anemia in suckling pigs which comprises administering iron choline citrate orally to the mother sow at a level higher than 600 milligrams of elemental iron from iron choline citrate per day for each 100 pounds of body weight of the sow and for a period and at a level sufficient to produce in the blood of her suckling pigs, at two weeks of age, a hemoglobin content higher than that produced in corresponding animals under corresponding conditions without such administration.

2. The method as defined in claim 1 in which the iron choline citrate is administered in the feed ration of the sow at a level higher than 300 milligrams of elemental iron per pound of total ration.

3. The method of combatting iron deficiency anemia in suckling pigs which comprises administering iron choline citrate orally to the mother sow in her feed ration at a level to give about 600 milligrams of elemental iron per pound of total ration.

4. The method as defined in claim 1 in which the administration of iron choline citrate is started prior to farrowing.

5. The method as defined in claim 1 in which the administration of iron choline citrate is started substantially at the time of farrowing.

6. The method as defined in claim 1 in which the administration is continued at least two weeks after farrowing.

7. The method of combatting iron deficiency anemia in suckling pigs which comprises administering iron choline citrate orally to the mother sow at a level to give approximately 1 gram of elemental iron per 100 pounds of body weight per day.

8. A medicated feed ration for administration to mother sows to combat iron deficiency anemia in her suckling pigs, which comprises a pig feed ration containing iron choline citrate in a proportion to supply a level higher than 300 milligrams and up to 800 milligrams of elemental iron per pound of feed and sufficient, when the sow is fed on such feed for two weeks after farrowing, to produce in the blood of her suckling pigs at the end of such two weeks a hemoglobin content higher than that produced in the pigs of a corresponding sow fed on the same feed without iron choline citrate.

9. A drinking water mixture for consumption by mother sows to combat iron deficiency anemia in her suckling pigs, comprising drinking water and iron choline citrate to supply at least about 100 mg. to 150 mg. of elemental iron per pound of drinking water.

10. The method of combatting iron deficiency anemia in suckling pigs which comprises administering iron choline citrate orally to the mother sow, at a level of at least about 600 milligrams of elemental iron from iron choline citrate per day for each 100 pounds of the body weight of the sow, beginning at least 7 to 14 days prior to farrowing, and for a period and at a level sufficient to produce in the blood of her suckling pigs, at two weeks of age, a hemoglobin content higher than that produced in corresponding animals under corresponding conditions without such administration.

References Cited

UNITED STATES PATENTS 2,575,611 11/1951 Bandelin.
2,955,981 10/1960 Linkenheimer.
3,259,500 7/1966 Barnhart et al.

ALBERT T. MEYERS, *Primary Examiner.*

R. S. BARRESE, *Assistant Examiner.*